(12) United States Patent
Collier et al.

(10) Patent No.: US 11,267,501 B2
(45) Date of Patent: Mar. 8, 2022

(54) STEERING DEVICE ANTI-ROTATION ASSEMBLY

(71) Applicant: Steering Solutions IP Holding Corporation, Saginaw, MI (US)

(72) Inventors: Bruce M. Collier, Saginaw, MI (US); Richard P. Nash, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 33 days.

(21) Appl. No.: 16/827,291

(22) Filed: Mar. 23, 2020

(65) Prior Publication Data
US 2020/0216111 A1    Jul. 9, 2020

Related U.S. Application Data

(62) Division of application No. 15/702,159, filed on Sep. 12, 2017, now Pat. No. 10,640,140.

(51) Int. Cl.
| | |
|---|---|
| *B62D 1/184* | (2006.01) |
| *B62D 1/183* | (2006.01) |
| *B62D 1/185* | (2006.01) |
| *B62D 5/04* | (2006.01) |
| *B62D 1/16* | (2006.01) |
| *F16D 11/00* | (2006.01) |
| *B62D 1/20* | (2006.01) |

(52) U.S. Cl.
CPC .............. *B62D 1/184* (2013.01); *B62D 1/16* (2013.01); *B62D 1/183* (2013.01); *B62D 1/185* (2013.01); *B62D 1/20* (2013.01); *B62D 5/04* (2013.01); *F16D 11/00* (2013.01)

(58) Field of Classification Search
CPC .......... B62D 1/184; B62D 1/16; B62D 1/183; B62D 1/181; B62D 1/185; B62D 1/18; B62D 1/20; B62D 5/04; B62D 5/001; B62D 5/091; B62D 5/092; B60T 2270/82
USPC ....... 280/775; 701/41; 180/402, 403; 74/493
See application file for complete search history.

(56) References Cited

U.S. PATENT DOCUMENTS 6,070,686 A * 6/2000 Pollmann ............ B60R 25/0221
                                                180/287

* cited by examiner

*Primary Examiner* — Keith J Frisby
(74) *Attorney, Agent, or Firm* — Dickinson Wright PLLC

(57) ABSTRACT

A steering column assembly includes a steering shaft operatively coupled to a steering device, the steering shaft and the steering device having corresponding rotation with each other. Also included is an anti-rotation assembly selectively engaged with a surface of the steering shaft to maintain the steering shaft and the steering device in a stationary condition when the steering shaft is rotationally decoupled from road wheels operatively coupled to the steering shaft.

7 Claims, 5 Drawing Sheets

STEERING DEVICE ANTI-ROTATION ASSEMBLY

CROSS-REFERENCE TO RELATED APPLICATION

This application is a divisional application of U.S. patent application Ser. No. 15/702,159, filed Sep. 12, 2017, the disclosure of which is incorporated by reference herein in its entirety.

BACKGROUND

The following description relates to steering column assemblies and, more particularly, to a steering device anti-rotation assembly.

As the automotive industry moves toward autonomously driven vehicles, there will be Advanced Driver Assist Systems (ADAS) that allow a vehicle to be autonomously controlled using sensing, steering, and braking technology. Implementing steering on ADAS vehicles may include decoupling the driver interface (e.g., steering wheel) from the steering actuator. However, a rotating driver interface may cause confusion, inconvenience or even harm to the driver during an autonomous driving mode. Even while decoupled, inadvertent rotation of the driver interface may occur due to vibration, friction, and gravitational imbalance, for example. Addressing the issue of a moving interface will assist with the overall development of autonomous vehicle technology and feasibility.

Some concepts associated with preventing rotation of a driver interface involve mechanical interlocks that require the steering wheel to be positioned in a single specific position or one of a finite, limited number of angular positions in order to facilitate locking. These concepts may be problematic because to initiate a locked wheel, the steering wheel must be first aligned with one of these specific angular positions. In addition, there may be difficulty engaging and/or disengaging the locking mechanism.

SUMMARY

According following description relates to steering column assemblies and, more particularly, to a steering device anti-rotation assembly. As the automotive industry moves toward autonomously driven vehicles, there will be Advanced Driver Assist Systems (ADAS) that allow a vehicle to be autonomously controlled using sensing, steering, and braking technology. Implementing steering on ADAS vehicles may include decoupling the driver interface (e.g., steering wheel) from the steering actuator. However, a rotating driver interface may cause confusion, inconvenience or even harm to the driver during an autonomous driving mode. Even while decoupled, inadvertent rotation of the driver interface may occur due to vibration, friction, and gravitational imbalance, for example. Addressing the issue of a moving interface will assist with the overall development of autonomous vehicle technology and feasibility.

Some concepts associated with preventing rotation of a driver interface involve mechanical interlocks that require the steering wheel to be positioned in a single specific position or one of a finite, limited number of angular positions in order to facilitate locking. These concepts may be problematic because to initiate a locked wheel, the steering wheel must be first aligned with one of these specific angular positions. In addition, there may be difficulty engaging and/or disengaging the locking mechanism.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various features of a steering column assembly for an autonomous vehicle are illustrated. As described herein, the embodiments provide a reliable and efficient assembly that maintains a steering device in a stationary position while the vehicle is operating in an autonomous or semi-autonomous driving mode. The steering device is referred to herein as a steering wheel (i.e., hand wheel), but it is to be appreciated that any device used to steer a vehicle would benefit from the embodiments described herein. For example, knobs, joysticks, etc. may be encompassed by the term "steering device."

The steering column assembly is part of an advanced driver assist system (ADAS) that is able to steer as well as control other parameters of the vehicle to operate it without direct driver involvement. Autonomous or semi-autonomous driving refers to vehicles that are configured to perform operations without continuous input from a driver (e.g., steering, accelerating, braking etc.) and may be equipped with technology that allows the vehicle to be autonomously or semiautonomously controlled using sensing, steering, and/or braking technology.

Figure 1:
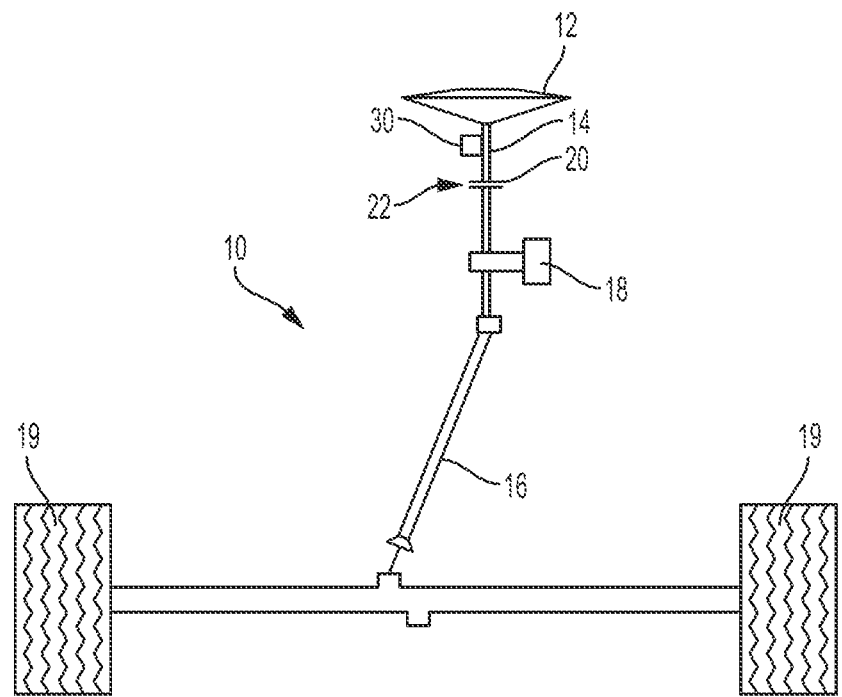
FIG. 1 is a schematic illustration of an embodiment of a steering system, including a steering column assembly.
Figure 2:
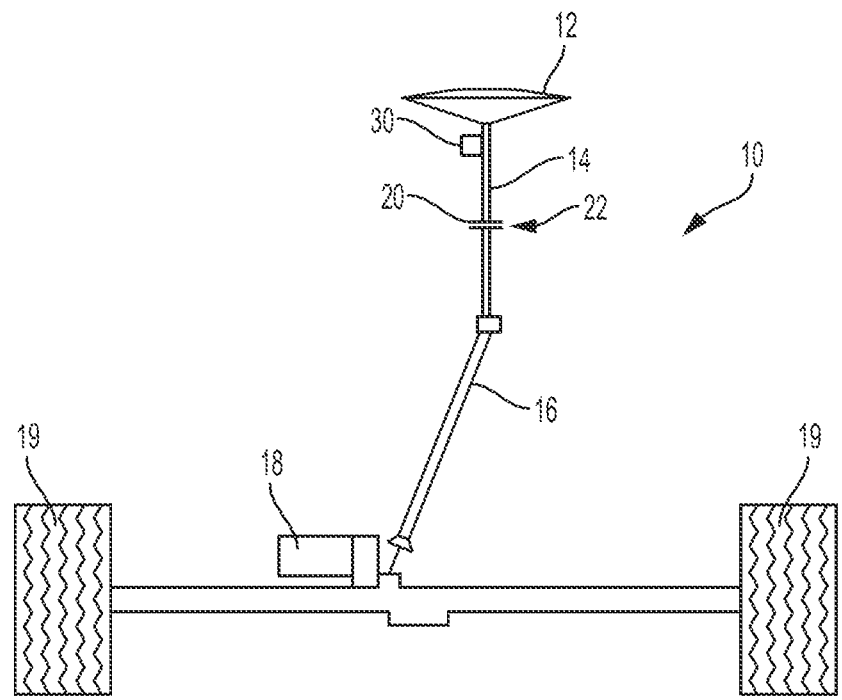
FIG. 2 is a schematic illustration of an embodiment of a steering system, including a steering column assembly.
Figure 3:
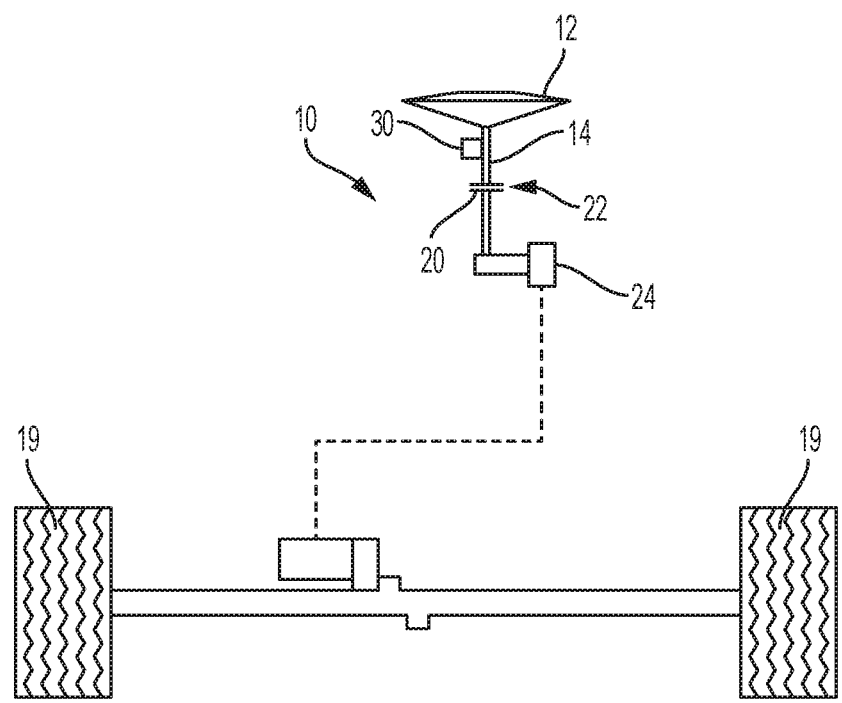
FIG. 3 is a schematic illustration of an embodiment of a steering system, including a steering column assembly.
Figure 7:
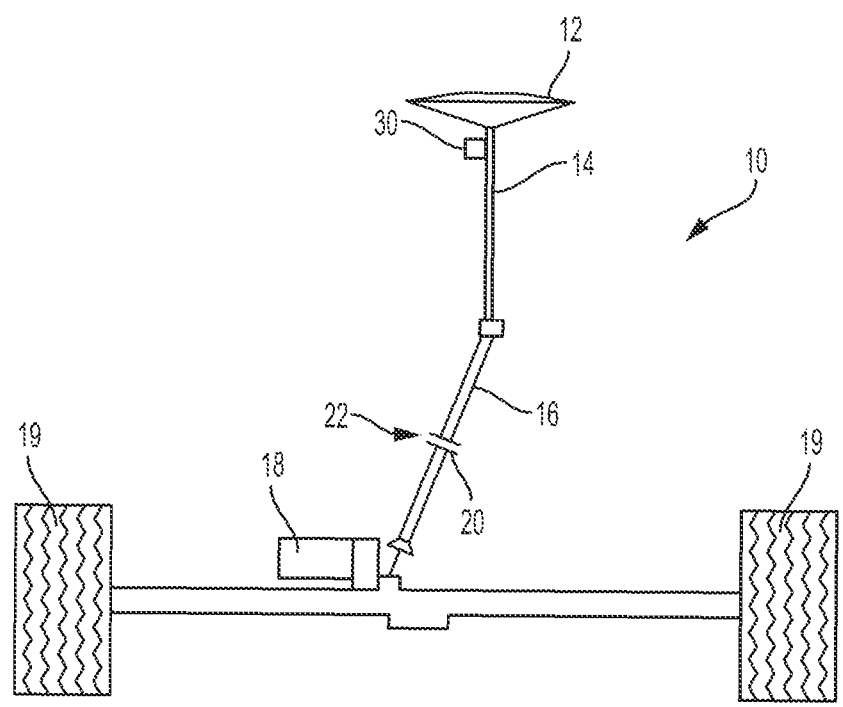
FIG. 7 is a schematic illustration of an embodiment of the steering system, including a steering column assembly.

Referring to FIGS. 1-3, schematic illustrations of various embodiments of steering systems 10, including steering column assemblies are shown. The steering systems 10, including steering column assembly described herein may be an electric power steering system, such as the embodiments shown in FIGS. 1 and 2. In these embodiments, a steering device, referred to as a steering wheel 12, is operatively coupled to a first steering shaft 14, with one or more additional steering shafts 16 (e.g., intermediate shaft) directly or indirectly coupled to the first steering shaft 14. A steering actuator 18 provides steering assist and/or feedback to a driver during manual driving. A decoupling mechanism 20, such as a clutch mechanism or the like, selectively couples and decouples the steering wheel 12 from the steering actuator 18, road wheels 19, etc., at a decoupling location 22. As shown in FIGS. 1 and 2, the location of the steering actuator 18 at least partially determines the location of the decoupling location 22. For example, in FIG. 1, the steering actuator 18 is in the passenger compartment of the vehicle and coupled to the first steering shaft 14. In such an embodiment, the decoupling location 22 is along the first steering shaft 14 or between the first steering shaft 14 and an additional shaft that is directly coupled to the steering wheel 12. In the example of FIG. 2, the steering actuator 18 is outside of the passenger compartment (e.g., under the vehicle hood). In such an embodiment, the decoupling location 22 may be along the first steering shaft 14 (as shown in FIG. 2) or along the one or more additional shafts 16 (as shown in FIG. 7).

FIG. 3 illustrates another example of the steering system 10, including a steering column assembly that facilitates decoupling the steering wheel 12 from the road wheels 19. In the illustrated embodiment, a steer-by-wire system includes an electrical connection between steering shaft 14 and the road wheels 19. In other words, a continuous mechanical structural relationship is not present between the steering shaft 14 and the road wheels 19. In this embodiment, a road emulator 24 is operatively coupled to the steering shaft 14 to transmit steering commands from the steering shaft 14 to the road wheels 19 and to provide road feedback to the driver in a manual driving mode. The decoupling location 22 is between the steering wheel 12 and the road emulator 24 in this embodiment.

The preceding exemplary steering systems 10, including steering column assemblies, facilitate selective coupling and decoupling between the steering wheel 12 and the road wheels 19, which is desirable for a vehicle equipped with autonomous or semi-autonomous driving capabilities. In a manual driving mode that requires manual inputs from a driver to steer the road wheels 19, the steering wheel 12 is coupled to the road wheels 19. In an autonomous driving mode that does not require manual inputs from the driver to steer the road wheels 19, the steering wheel 12 is decoupled from the road wheels 19. The decoupled (or rotationally decoupled) condition results in independent rotation of the steering wheel 12, such that rotation of road wheel angular movement does not require or result in corresponding rotation of the steering wheel 12.

Each of the embodiments shown in FIGS. 1-3 include an anti-rotation assembly 30 that prevents inadvertent rotation of the steering wheel 12 in the autonomous driving mode, where the steering wheel 12 is in the decoupled condition. Inadvertent rotation may occur for a variety of reasons, including but not limited to vibration, friction, gravitational imbalance, etc. Maintaining the steering wheel 12 in a stationary position reduces the likelihood of driver confusion, inconvenience and/or harm. Placing the steering wheel 12 in the stationary position occurs upon transition to the decoupled condition of the steering system 10.

As described herein, the anti-rotation assembly 30 does not require a specific radial orientation to engage and disengage, as is the case with other devices that involve interlocks with mechanical engagement to teeth, slots or the like. Interlocking devices require the steering wheel to be positioned in one of a finite, limited number of angular positions in order to lock, which may require considerable force to retract the lock pin, or the like, when there is torque on the steering wheel.

Figure 4:
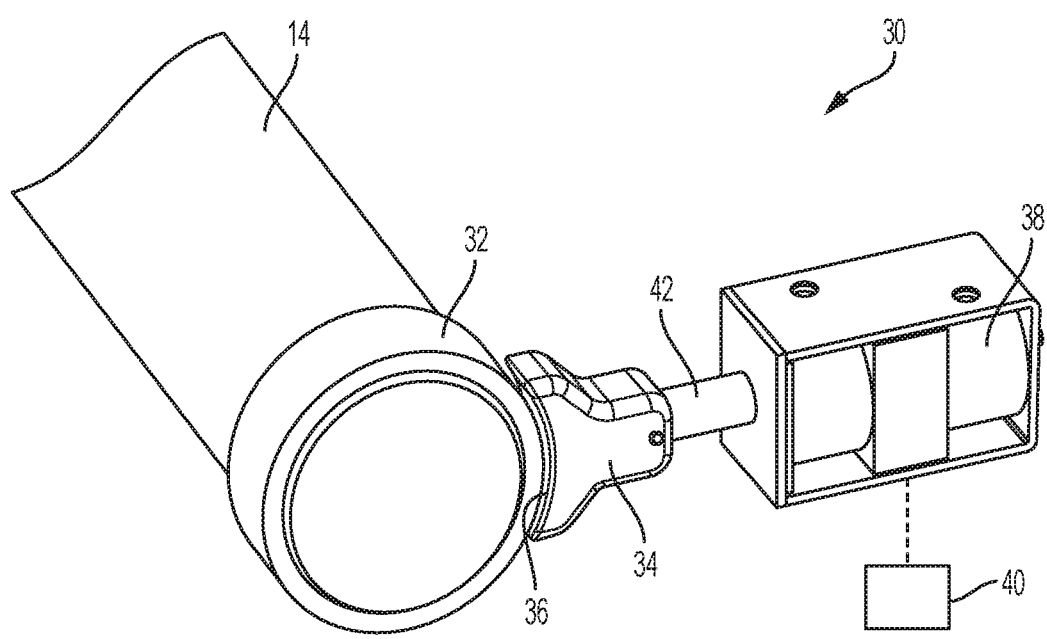
FIG. 4 is a steering device anti-rotation assembly according to an aspect of the disclosure.

Referring now to FIG. 4, an embodiment of the anti-rotation assembly 30 is illustrated in more detail. The steering shaft 14 includes a contact surface region 32 that extends at least partially around the outer circumference of the steering shaft 14. In the illustrated embodiment, the contact surface region 32 extends completely (i.e., 360 degrees) around the outer circumference of the steering shaft 14. The contact surface region 32 is selectively contacted, or engaged, with a friction shoe 34 to prevent rotation of the steering shaft 14 and consequently the steering wheel 12. The friction shoe 34 has a contact engagement surface 36 that has a radius of curvature that substantially contours to the contact surface region 32 of the steering shaft 14.

The friction shoe 34 is operatively coupled to, or integrally formed with, an actuator 38. The actuator 38 may be any type of actuator, including electric, pneumatic, hydraulic, etc. In these actuator examples, the actuator 38 is in operative communication with a controller 40 that commands engagement or disengagement between the friction shoe 34 and the steering shaft 14 based on the driving mode of the vehicle and whether the steering column assembly 10 is in the coupled condition or the decoupled condition. The controller 40 may be in operative communication, or be part of, an advanced driving assist steering (ADAS) system. Alternatively, the actuator 38 may be manually controlled by the driver with a lever or the like.

The friction shoe 34 is moved into engagement or disengagement with the steering shaft 14 with any suitable driving structure that is coupled to, or part of, the actuator 38. In the illustrated embodiment, a pin 42 extends between the actuator 38 and the friction shoe 32. Extension of the pin 42 forcibly drives the friction shoe 34 into contact with the contact surface region 32 of the steering shaft 14 and retraction of the pin 42 discontinues contact between the steering shaft 14 and the friction shoe 32.

As described above, inadvertent rotation of the steering wheel 12 and steering shaft 14 may occur even in the decoupled condition. The frictional contact between the friction shoe 34 and the steering shaft 14 is sufficient to maintain the steering wheel radial orientation, in any radial position, during autonomous driving operation. The stationary condition may be achieved regardless of the telescope position of the steering wheel 12 and minimum force is required to disengage the anti-rotation assembly 30 when exiting the stationary condition.

Figure 5:
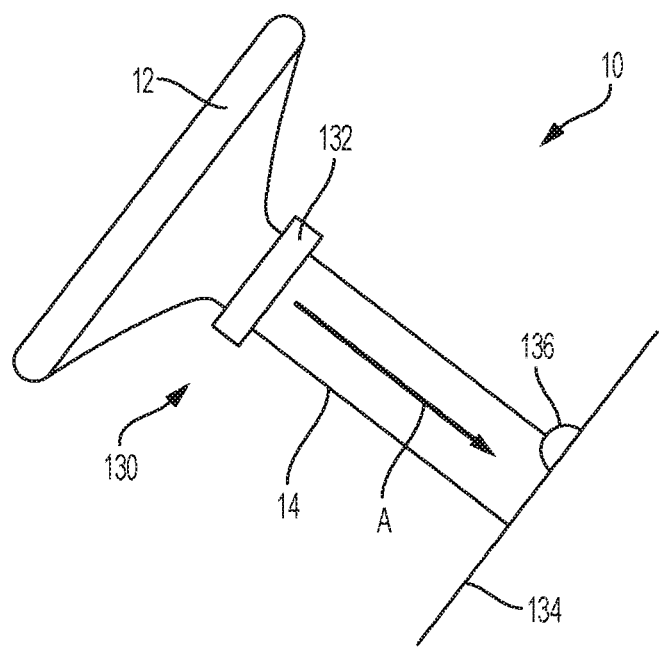
FIG. 5 is a steering device anti-rotation assembly according to another aspect of the disclosure shown, the steering column assembly shown in an extended position.
Figure 6:
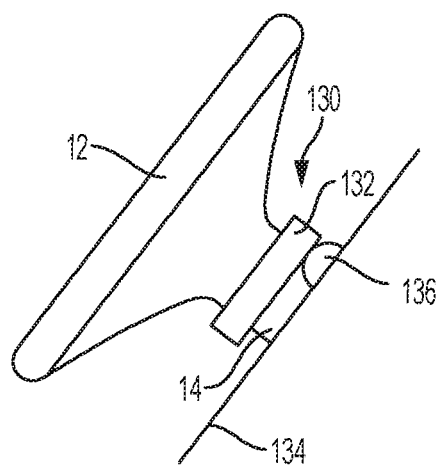
FIG. 6 illustrates the steering device anti-rotation assembly of FIG. 5, the steering column assembly shown in a retracted position.

Referring now to FIGS. 5 and 6, another embodiment of the anti-rotation assembly is illustrated and generally referenced with numeral 130. The anti-rotation assembly 130 includes a friction disk 132 operatively coupled to the steering shaft 14 or the steering wheel 12. The friction disk 132 extends completely around the outer circumference of the steering shaft 14.

As shown with arrow A, the steering column assembly 10 generally, and more specifically the steering wheel 12, is translatable between an extended position (FIG. 5) and a retracted position (FIG. 6). The extended position corresponds to a range of positions that are associated with a range of driving positions that comfortably allow a driver to steer the vehicle in the manual driving mode. This position may be referred to as an un-stowed position. The retracted position corresponds to one or more positions that are located further away from the driver than positions commonly associated with manual driving and may be referred to as a stowed position(s). In the retracted position, the steering wheel 12 is located in close proximity to a vehicle stationary structure 134. The close proximity includes embodiments where a distance is between the steering wheel 12 and the vehicle stationary structure 134 and embodiments where the steering wheel 12 is in contact with the vehicle stationary structure 134, including retracted within the structure 134. The vehicle stationary structure 134 may be any structure that is substantially stationary relative to the vehicle. For example, the vehicle stationary structure 134 may be an instrument panel or a cross-car beam. These are merely illustrative and it is to be understood that other vehicle structures may be employed. Regardless of the precise structure that is the vehicle stationary structure 134, a friction pad 136 is operatively coupled thereto. The friction disk 132 and the friction pad 136 are positioned such that they are in frictional contact when the steering wheel 12 is disposed in the retracted position. The frictional contact between the friction disk 132 and the friction pad 136 is sufficient to maintain the steering wheel radial orientation, in any radial position, during autonomous driving operation.

Although the anti-rotation assembly 130 illustrated and described above has the friction disk 132 operatively coupled to the steering wheel 12 or the steering shaft 14 and the friction pad 136 operatively coupled to the vehicle stationary structure 134, it is to be appreciated that the reverse configuration may be provided in some embodiments.

As with the embodiment of FIG. 4, the anti-rotation assembly 130 facilitates frictional engagement at any radial position of the steering wheel 12 upon retraction. Additionally, the assembly 130 does not require any additional actuator, as retraction and extension of the steering wheel 12 engages and disengages the anti-rotation assembly 130.

While the present disclosure has been described in detail in connection with only a limited number of embodiments, it should be readily understood that the present disclosure is not limited to such disclosed embodiments. Rather, the invention can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or various combinations of the described embodiments. Accordingly, the present disclosure is not to be seen as limited by the foregoing description.

Having thus described the invention, it is claimed:

1. A steering column assembly comprising:
   a steering shaft operatively coupled to a steering device, the steering shaft and the steering device having corresponding rotation with each other, the steering device translatable to a retracted position in an autonomous driving mode, the retracted position placing the steering device proximate a vehicle stationary structure; and
   an anti-rotation assembly to maintain the steering shaft and the steering device in a stationary condition when the steering device is in the retracted position, the anti-rotation assembly comprising:
   a friction disk operatively coupled to one of the steering shaft and the vehicle stationary structure; and
   a friction pad operatively coupled to one of the steering shaft and the vehicle stationary structure, the friction disk and the friction pad being operatively coupled to different components, the friction disk and the friction pad in contact when the steering device is in the retracted position to maintain the steering device in the stationary condition.

2. The steering column assembly of claim 1, wherein the friction disk extends completely around a circumference of the steering shaft.

3. The steering column assembly of claim 1, wherein the vehicle stationary structure is an instrument panel.

4. The steering column assembly of claim 1, wherein the vehicle stationary structure is a cross-car beam.

5. The steering column assembly of claim 1, wherein the steering column assembly is part of an electric power steering system.

6. The steering column assembly of claim 1, wherein the steering column assembly is part of a steer-by-wire steering system.

7. The steering column assembly of claim 1, wherein the steering column assembly is part of an advanced driving assist steering (ADAS) system.

* * * * *